United States Patent Office 3,333,522
AIR CONDITIONING DISTRIBUTION SYSTEM
Paul D. Fadow, Dearborn Heights, Mich., assignor to Ford Motor Company, Dearborn, Mich., a corporation of Delaware
Filed Dec. 10, 1965, Ser. No. 512,916
1 Claim. (Cl. 98—2)

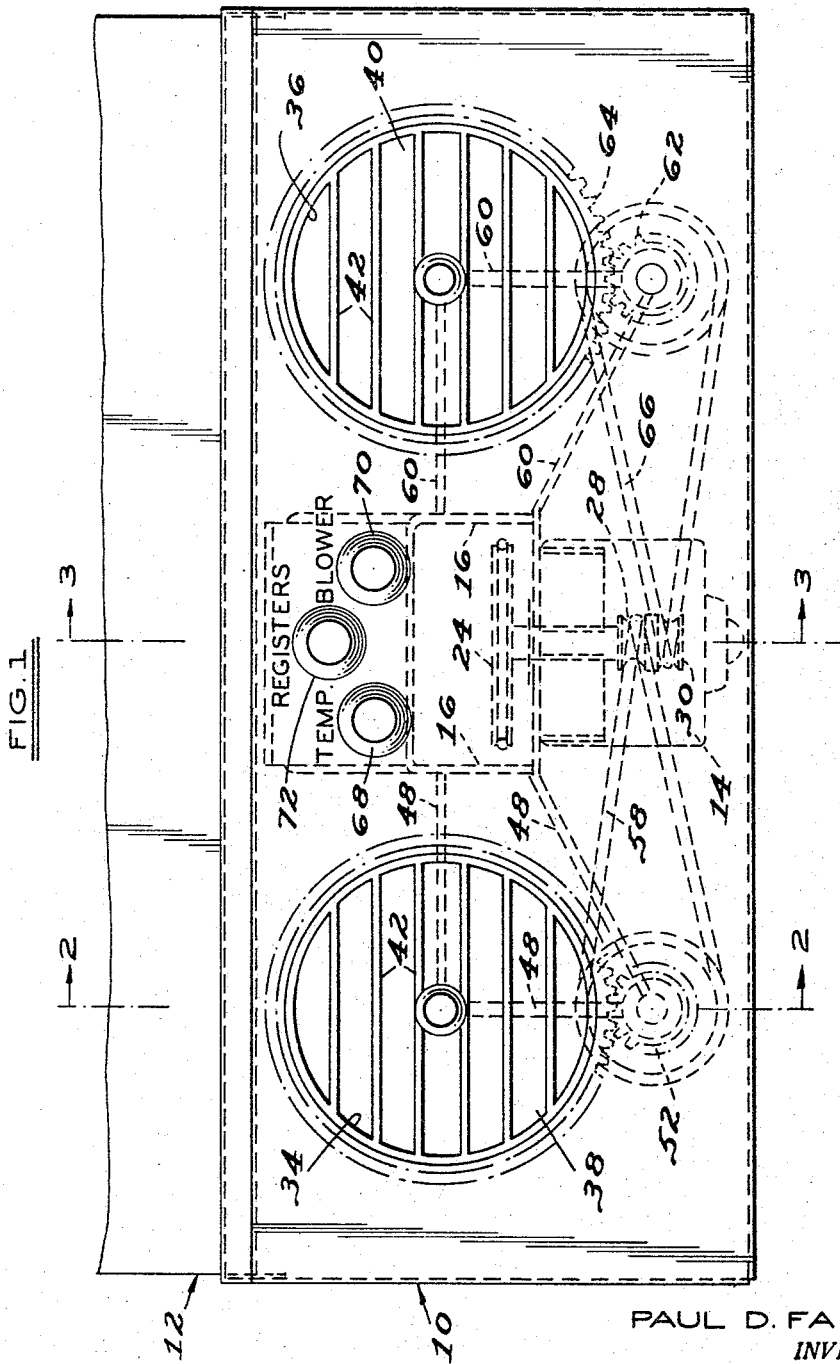

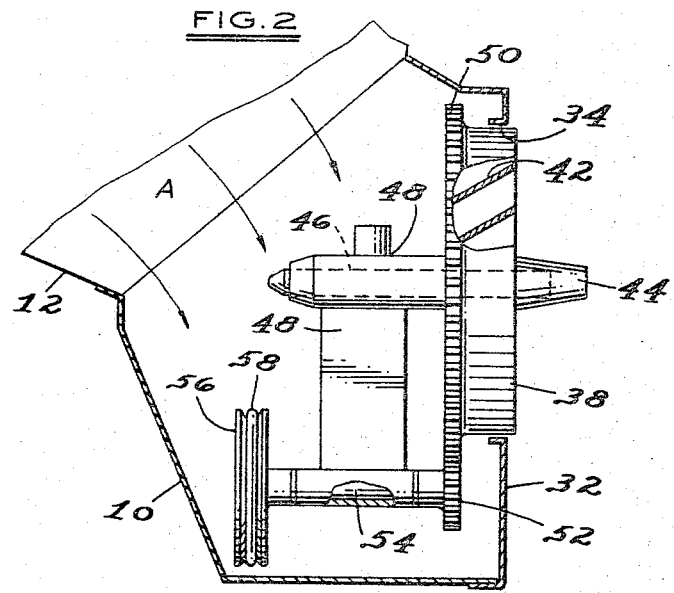
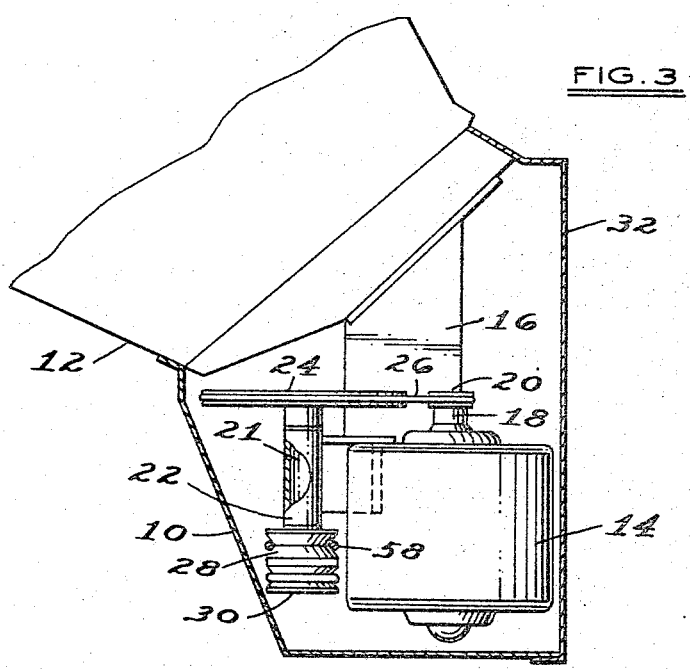

ABSTRACT OF THE DISCLOSURE

An automobile air conditioning distribution system having flexible belt driven rotatable outlet registers that sweep the interior of the automobile with conditioned air.

---

The present invention relates generally to air conditioning devices, and more particularly to an air distributing mechanism for an air conditioning system.

The present invention has particular application to air conditioning systems for passenger cars. Substantial problems are presented in providing adequate air conditioning for the occupants of a passenger car. The passenger compartment is of a relatively confined space, the window area is substantial and the vehicle is normally exposed to the direct rays of the sun. In order to provide for passenger comfort, the air conditioning device must have adequate capacity and the distribution system for the conditioned air must be capable of cooling all of the passengers within the vehicle.

It is customary, according to present day automotive design practice, to provide relatively small louvered outlets for the air conditioner. These outlets are usually adjustable to permit the directing of an intense stream of air at a passenger or at some other point within the vehicle. The air coming from the outlets is of relatively high velocity and the passenger sitting in the path of the airflow will receive a direct blast of cold air, while the passenger sitting next to him may receive little effect from the air conditioner.

The outlets of the air conditioner are usually located in the area of the instrument panel which is already crowded with a speedometer, radio, glove box and the gauges that report various aspects of vehicle function. This crowded condition greatly restricts the air conditioning engineer in the number and the size of outlets that he can design.

In view of the problems presented by prior art structures, it is the principal object of the present invention to provide an air conditioning distribution system that employs outlets of relatively small size that are capable of sweeping the entire interior of the passenger compartment with cold air.

In the presently preferred embodiment of this invention, the above object is achieved by providing outlets with circular louvered registers for an air conditioning device that are motor driven for continual rotation. Because the registers have vanes that are set at an angle, their rotation produces a sweeping action of cold air across all passengers and the interior of the vehicle.

The many objects and advantages of the present invention will become amply apparent upon consideration of the following discussion and the accompanying drawings in which:

FIGURE 1 is a front elevational view of an air conditioning device for a motor vehicle that incorporates the present invention;

FIGURE 2 is a sectional view taken along section lines 2—2 of FIGURE 1; and

FIGURE 3 is a sectional view taken along section lines 3—3 of FIGURE 1.

Referring now to the drawings for a detailed description of the present invention, FIGURE 1 illustrates a plenum chamber 10 of an air conditioning device for a passenger car. The plenum chamber 10 collects air that is exhausted from the evaporator case 12 where the cooling coils are located.

Situated within the plenum chamber 10 is an electric motor 14 that is supported on a member 16 affixed to the walls forming the chamber 10. The rotating shaft 18 of the motor 14 extends upwardly and has a pulley 20 secured to its end.

A short shaft 21 is rotatably supported on support structure 22. A large pulley 24 is secured to the upper end of the shaft 21. A belt 26 is wrapped around the grooves provided in the pulleys 20 and 24 so that the motor 14 is in driving engagement with the pulley 24 and the shaft 21 situated within the support 22. A pair of small pulleys 28 and 30 are connected to the lower end of the shaft 21.

The plenum chamber 10 is provided with a front face 32 which, in turn, has a pair of spaced apart circular openings 34 and 36. A circular register 38 is situated within the opening 34 and a similar circular register 40 situated within the opening 36. Each of the registers 34 and 38 is provided with a series of angled louvers 42. A hub portion 44 of the register 38 is connected to a shaft 46 that is rotatably supported by support structure 48.

Concealed behind the face panel 32 of the plenum chamber 10 is a series of gear teeth 50 formed on the periphery of the register 38. The gear teeth 50 are in mesh engagement with a pinion 52. The pinion 52 is supported by a shaft 54 carried in the support structure 48. The rear end of the shaft 54 supports a pulley wheel 56. A belt 58 connects the pulley wheel 56 in driving engagement with the pulley wheel 28.

On the opposite side of the plenum chamber 10, the circular register 40 is rotatably supported by support structure 60. The same structure 60 also supports a gear wheel 62. The pinion 62 is in driving engagement with teeth 64 formed on the periphery of the register 40. The pinion 62 is driven by a belt 66 that is connected to the small pulley 30.

A plurality of controls are provided for the air conditioning unit. The left-hand control in FIGURE 1 identified by reference numeral 68 controls the flow of refrigerant through the evaporator or cooling coils contained within the evaporator case 12. The right-hand control 70 controls the speed of the blower motor and, thus, the velocity of air passing through the evaporator case 12, the plenum chamber 10, and out the registers 38 and 40. The register control 72 controls the motor 14.

It will be observed that when the motor 14 is turned on, the shaft 18 and pulley 20 will rotate causing the belt 26 to drive the large pulley 24 which, in turn, drives the shaft 21 and the two pulleys 28 and 30. Because the pulleys 28 and 30 are in driving engagement by the belts 58 and 66 with the pinion gears 62 and 52, the registers 38 and 40 will be rotated. By selecting the manner in which the belts 58 and 66 are wrapped about the pulleys 28 and 30, the direction of rotation of the registers 38 and 40 can be controlled. The registers 38 and 40 may be arranged to rotate together or they may be arranged to rotate in opposite directions.

Referring to FIGURE 2, it will be noted that air flows into the plenum chamber 10 from evaporator case 12 as indicated by the arrows A. This air is discharged through the registers 38 and 40 between the louvers 42. The louvers 42 control the direction of flow of the discharged air. By continually rotating these registers, the discharged air can be directed to sweep a substantial area, an area far greater than would be possible with a small register of fixed position. Thus, this invention permits the automotive designer to overcome the space restrictions that are imposed upon him.

It should be noted that while this invention has been described in connection with an automotive air conditioning unit, the concept of rotating registers is also applicable to units discharging heated air or merely fresh air. It also has application to stationary units as well as those installed in an automobile.

The foregoing description presents the present preferred embodiment of this invention. Alternations and modifications may occur to those skilled in the art that will come within the scope and spirit of the following claim.

I claim:

In a motor vehicle having a body portion, a dash panel supported by said body portion, an air conditioning evaporator case secured under said dash panel, an air distribution system supported by said evaporator case and comprising an outlet chamber,
- a pair of outlet openings in said chamber,
- said outlet openings being circular in configuration,
- a pair of round registers rotatably mounted in said opening,
- said registers having louver means set at an angle to the axis of rotation of said register to direct the flow of air being discharged from said openings,
- said registers having gear teeth formed on the peripheries thereof,
- a main shaft having a double channeled pulley at one end,
- motor means connected to said main shaft and constructed to rotate said main shaft,
- a pair of secondary shafts having pulleys mounted at one of the ends and pinion gears mounted at the other of the ends to rotate therewith,
- said pinion gears meshing with and driving said register gear teeth,
- a pair of flexible belts connecting said double channeled pulley and the secondary shaft pulleys,
- one of said flexible belts transmitting motion from one channel of said double channel pulley to one of said secondary shaft pulleys, the other of said flexible belts transmitting motion from the other channel of said double channeled pulley to the other of said secondary shaft pulleys,
- whereby said registers rotate and direct air flowing through said opening toward a greater area than would be contacted if said registers were stationary.

References Cited

UNITED STATES PATENTS

| | | | |
|---|---|---|---|
| 2,761,374 | 9/1956 | Sandler | 98—40 X |
| 2,779,264 | 1/1957 | Petersime | 98—40 |
| 2,824,429 | 2/1958 | Zucker | 62—262 |
| 2,976,795 | 3/1961 | Brugler | 98—108 X |

MEYER PERLIN, *Primary Examiner.*

ROBERT A. O'LEARY, *Examiner.*

M. A. ANTONAKAS, *Assistant Examiner.*